FULL FEATHERING PROPELLER

Original Filed Nov. 6, 1952 3 Sheets-Sheet 1

INVENTOR.
DAVID BIERMANN
BY Faulmann & Faulmann
ATTORNEYS

FULL FEATHERING PROPELLER

Original Filed Nov. 6, 1952 3 Sheets-Sheet 2

INVENTOR.
DAVID BIERMANN
BY Toulmin & Toulmin
ATTORNEYS

FULL FEATHERING PROPELLER
Original Filed Nov. 6, 1952 3 Sheets-Sheet 3
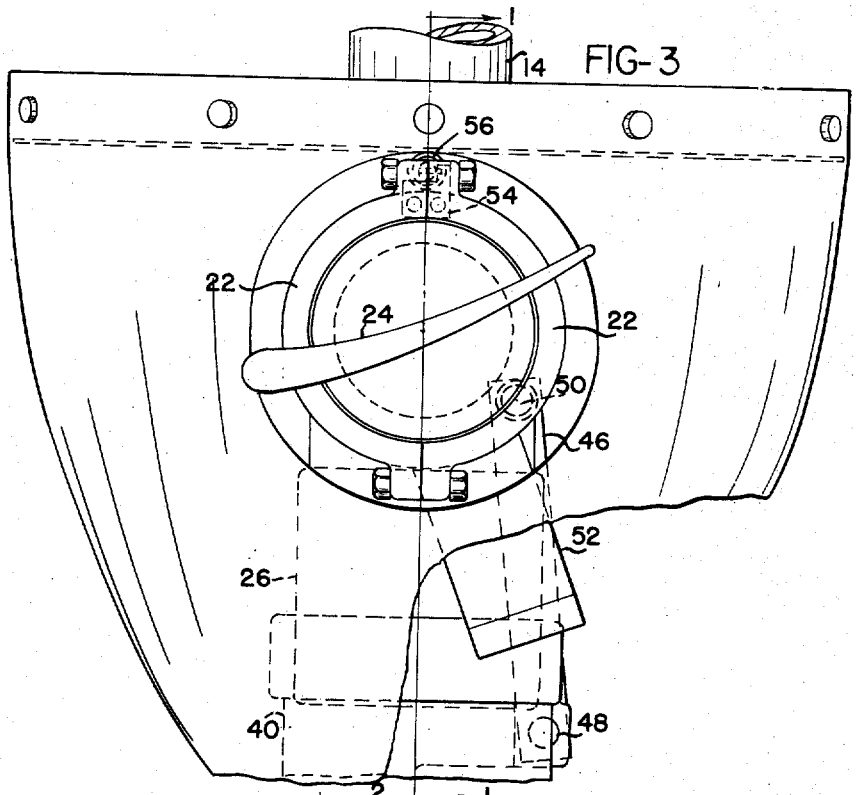
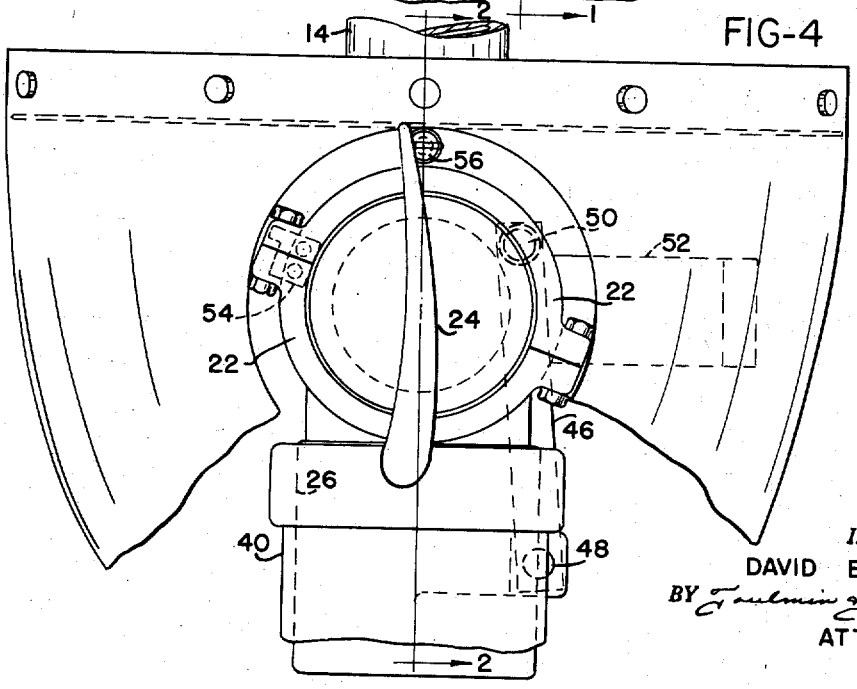
INVENTOR.
DAVID BIERMANN
BY Faulmin & Faulmin
ATTORNEYS United States Patent Office Re. 24,530
Reissued Sept. 2, 1958

24,530

FULL FEATHERING PROPELLER

David Biermann, Piqua, Ohio, assignor to Hartzell Industries Inc., Piqua, Ohio, a corporation of Ohio Original No. 2,722,985, dated November 8, 1955, Serial No. 319,019, November 6, 1952. Application for reissue January 11, 1956, Serial No. 558,606

9 Claims. (Cl. 170—160.21)

Matter enclosed in heavy brackets [ ] appears in the original patent but forms no part of this reissue specification; matter printed in italics indicates the additions made by reissue.

This invention relates to propellers for aircraft, particularly to a propeller having adjustable blades, more particularly to the full feathering of such a propeller and the method of operating the propeller.

Adjustable pitch propellers are substantially standard equipment in modern propeller driven aircraft and it occasionally becomes necessary for the pitch of a propeller of this nature to be increased to the point where the propeller blade rests edgewise to the direction of flight of the aircraft which it drives and in which position the propeller is said to be full feathered. This circumstance arises, for example, in connection with a multi-engine craft when one or more of the engines fail and it becomes necessary to fly the craft on the remaining engine or engines. At this time it is essential that the propeller blades of the engines not in operation be brought to a full feathered condition whereby wind resistance is greatly reduced, making it possible to fly the craft with the reduced power available, and also preventing windmilling of the engines not in operation and which could result in serious difficulties if the engines were, for example, leaking oil or included broken parts.

Heretofore, certain problems have been encountered in connection with the full feathering of propellers in that they either do not feather fully or else the feathering operation required too great a time to accomplish.

With the foregoing in mind it is a primary object of this invention to provide means for quickly bringing a propeller to full feathered condition, while insuring that the propeller blades will halt in exactly the right position to give absolutely full feathering.

Another object is to provide an arrangement which can be controlled from the pilot's cabin for quickly and accurately accomplishing the full feathering of an adjustable pitch propeller.

A still further object is the provision of an adjustable pitch propeller having an arrangement for effecting the full feathering thereof substantially instantaneously and which does not interfere in any way with the mechanism employed for adjusting the pitch of the propeller blade.

A still further object of this invention is to provide an adjustable pitch propeller in which the propeller is prevented from moving to a full feathered position under normal conditions of operation of the propeller when it is brought to a halt by stopping the driving engine therefor.

A particular object of this invention is the provision of an adjustable pitch propeller having a spring action on the propeller blades urging them toward their feathered position.

*Another object of this invention is the provision of an adjustable pitch propeller arrangement in which the control of the pitch of the propeller blade is accomplished by a new cooperation between the basic forces acting on the propeller blade.*

*A still further object of the present invention is the provision of an adjustable pitch propeller in which centrifugal force is utilized in controlling the pitch angle of the propeller blades, and which means is arranged to be at its maximum effectiveness when the propeller is in cruising pitch, but which does not interfere with the feathering of the propeller.*

The foregoing objects and advantages will become more apparent upon reference to the following description taken in connection with the accompanying drawings in which:

Figure 3 is a plan view looking down on top of the propeller in the position it occupies in Figure 1.

Figure 4 is a view like Figure 3 but shows the propeller in its Figure 2 position.

Figure 1:
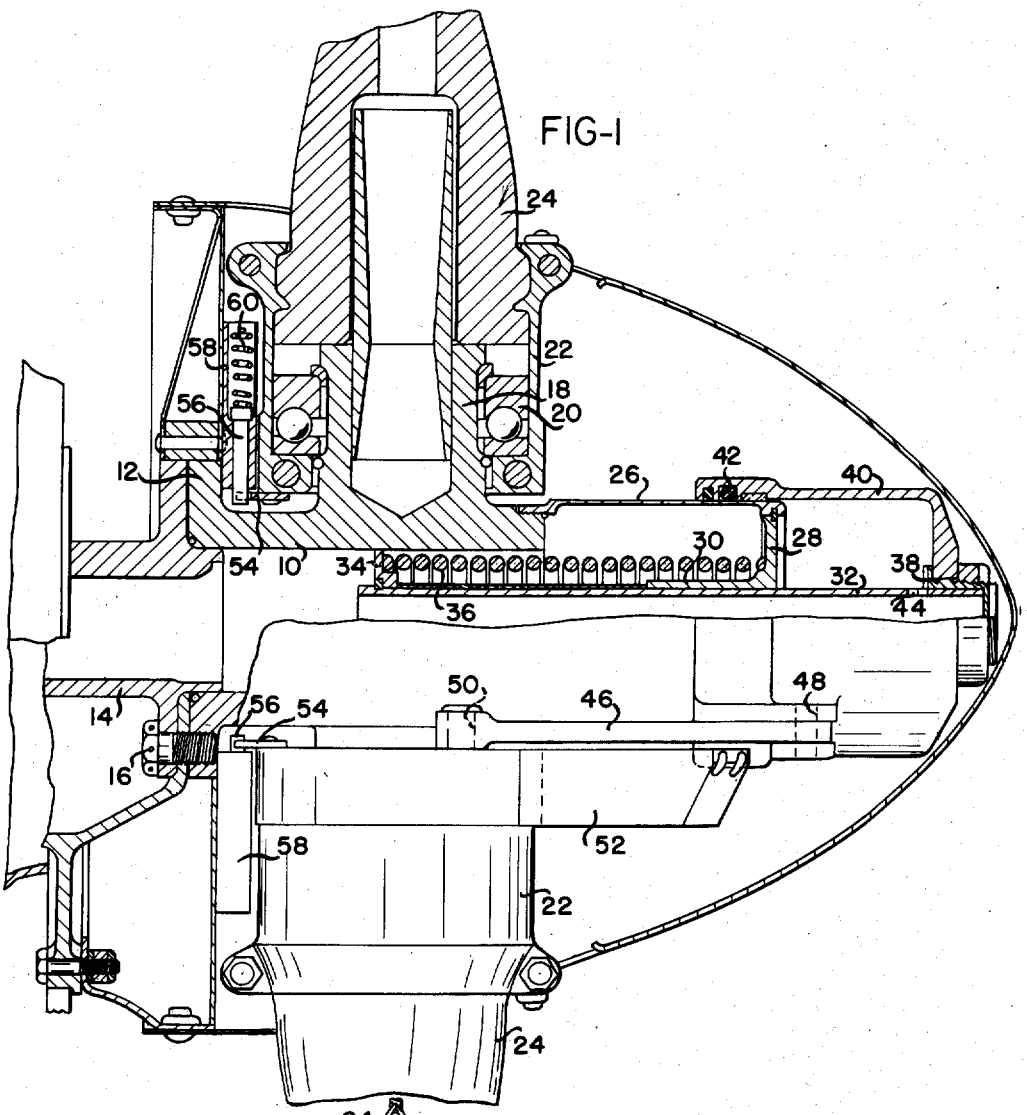
Figure 1 is a partial sectional view showing the hub part of a propeller constructed according to my invention and with the blades of the propeller stopped in the maximum pitch position which they occupy when the engine has been brought to a halt in a normal manner.

Referring to the drawings somewhat more in detail, the propeller according to the present invention comprises a central drive hub 10 secured by means of a flange 12 thereon to the end of an engine crankshaft 14 as by the cap screws 16. Hub 10 has radially projecting portions 18 which carry the thrust bearings 20 that are engaged by the clamp members 22, the outer ends of which clamp members grip the inner ends of propeller blades 24.

A stationary piston 26 is connected with hub 10 and extends outwardly therefrom and has its outer end closed by a member 28 that includes a stem portion 30 bored for slidably fitting on a tube 32. Tube 32 at its left end carries a collar 34 against which one end of spring 36 abuts, the other end of spring 36 bearing against the left side of member 28.

The right end of tube 32 has fastened thereto a nut 38 which closes the end of the said tube 32 and also provides means for connecting hollow cylinder 40 to the end of the said tube. Cylinder 40 extends over the end of piston 26 and sealingly engages the same as by the packing means 42.

Tube 32 is availed of for conducting fluid under pressure into cylinder 40 by means of the port means 44 in the extreme right end of the tube. It will be apparent that a supply of fluid under pressure to cylinder 40 will cause rightward movement thereof on piston 26 and this will move tube 32 rightwardly carrying with it collar 34 whereby spring 36 is compressed.

This movement of cylinder 40 is utilized for adjusting the pitch of the propeller blades by links 46 which are pivoted at their one ends as at 48 to cylinder 40 and at their other ends as at 50 to a point on clamp 22 associated with the adjacent blade.

Each clamp member 22 also comprises a counter weight 52 attached to the clamp members and extending radially outwardly therefrom. These counter weights are arranged as will be seen in Figures 3 and 4 so as to extend substantially at right angles to the plane of the associated propeller blade.

It will be apparent that the counter weights 52 will provide for a torque on their respective propeller blades tending to increase the pitch of the said blades whenever the blades are positioned at greater than zero pitch and less than full pitch; full pitch, of course, being the full feathered position of the propeller blades. This movement of the blades toward increased pitch position is assisted by the spring 36 so that at any time the propellers are rotating and the oil pressure is released from cylinder 40, blades will quickly move to maximum pitch, or full feathered position.

*Due to the fact that the useful centrifugal force developed varies as the counter weights move, the useful angular range for each counter weight is considerably less than 90° and is actually considerably closer to 45° of rotation of the propeller blade.*

*Since the feathering of the propeller blade will require a range of angular movement of at least 70° it will be apparent that if the useful centrifugal force developed by the counter weights is strongest during the cruising pitch range, then the torque on the blades developed by these forces will be reduced substantially to zero as the blade is moved to feathered position, and may even pass through zero and commence acting in the opposite direction.*

*Thus, while the spring means 36 operates with, or is assisted by, the centrifugal force developed by the counter weights 52 to increase pitch when the propeller is at cruising angular range, these two forces may actually oppose each other when the propeller is feathered.*

*The centrifugal force developed by each counter weight is responsive to rotational speed, and is thus highest when the propeller is rotating rapidly. However, when the propeller is being feathered its rotational speed reduces and the centrifugal force developed by each counter weight thus becomes smaller and smaller and the spring which is acting on the propeller blade, namely, spring 36, becomes more and more the dominant force.*

In normal operation of the propeller it is desirable to prevent the propeller from moving to maximum pitch position when the engine is brought to a halt in the normal manner. In order to provide for this feature, the propeller construction of this invention has mounted on each of the clamp members 22 a notch or apertured plate 54 adaptable to receiving a plunger 56 that is carried in a sleeve 58 supported with a flange. A spring 60 urges each plunger 56 inwardly with a predetermined thrust so that in normal operation when the engine is brought to a gradual halt, the pins 56 will engage their plates 54 and will halt the propeller blades in about their Figure 3 position. This gives the propeller blades the desired pitch for again starting the engine under normal operating conditions.

The stop pins 56 are adapted to throw out at relatively low speeds, for example, 500 to 1000 R. P. M. and at speeds greater than that, the stop will be disengaged so that the propeller can be adjusted to any desired pitch, or can be full feathered substantially immediately.

The provision of the stop for the propeller blades also prevents the spring 36 from gradually forcing the propeller blades into full feathered position when the engine is brought to a halt and thus forcing the oil out of the cylinder along leakage paths in the governor mechanism and oil seals of the engine.

Figure 5:
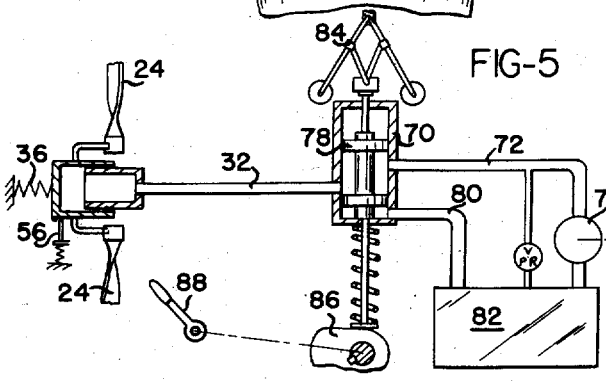
Figure 5 is a diagrammatical view showing the hydraulic control system for adjusting the pitch of the propeller as it appears when the propeller is in normal operation.
Figure 2:
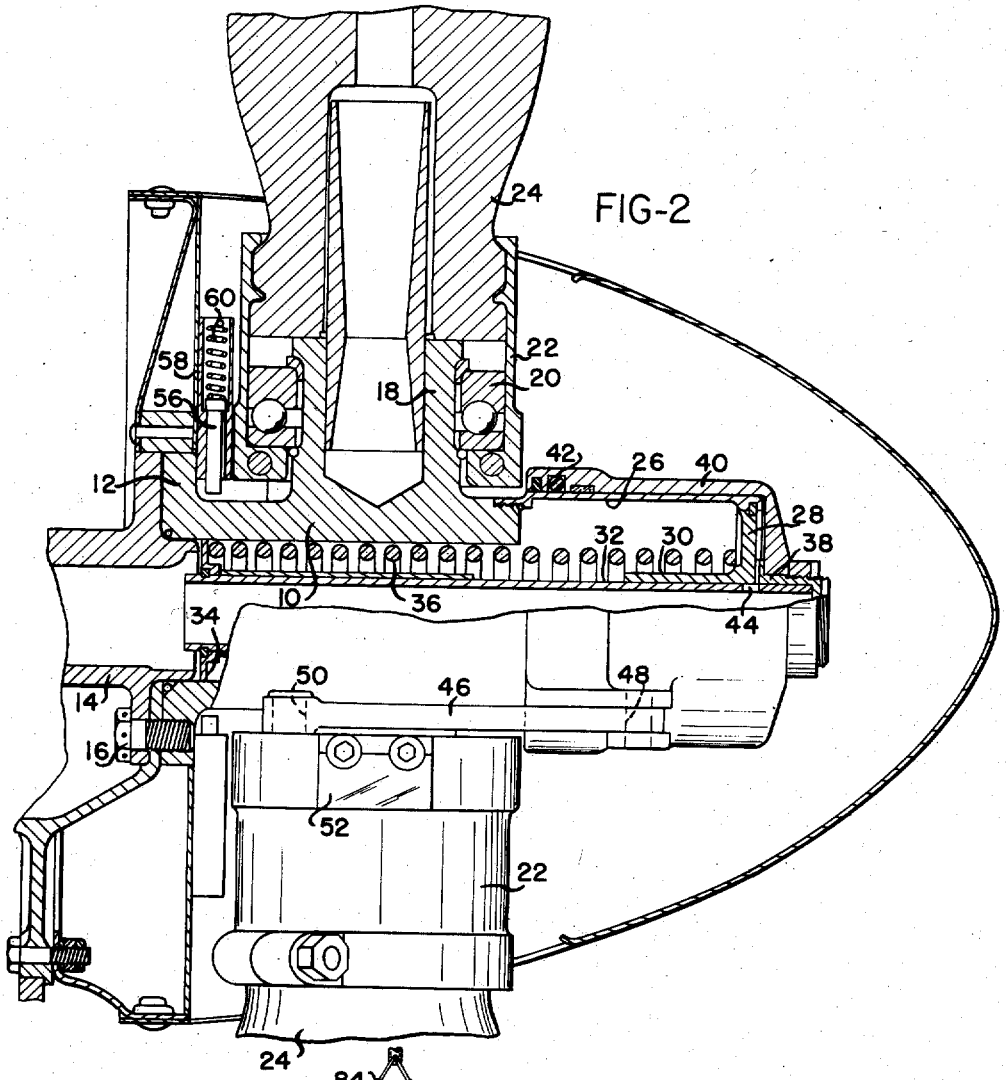
Figure 2 is a view similar to Figure 1 but showing the propeller blades in full feathered position.
Figure 6:
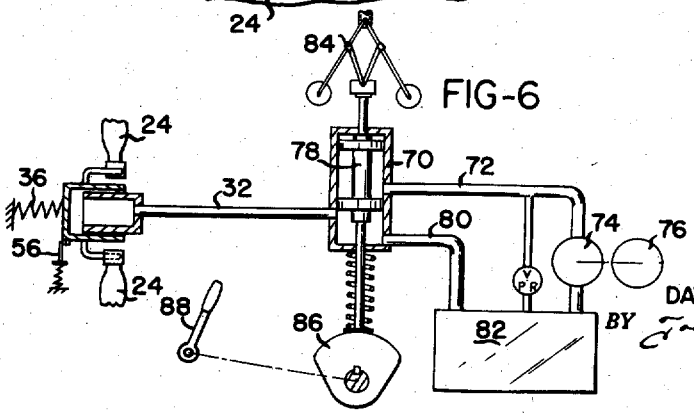
Figure 6 is a view like Figure 5 but shows the hydraulic control system as it is adjusted for bringing the propeller into a full feathered position.

The governor mechanism by which fluid under pressure is supplied to cylinder 40 or exhaust therefrom may be of substantially any conventional type and is illustrated diagrammatically in Figures 5 and 6 of the drawings.

In these views there is provided a control valve 70 to which pressure fluid is supplied by conduit 72 from a pump 74 that may be engine driven or which may be driven by an auxiliary motor 76. The valve comprises a valve member 78 which in one position connects tube 32 with pressure line 72, in another position connects tube 32 with exhaust conduit 80 leading to reservoir 82, and in a third position interrupts flow to or from tube 32 thereby entrapping the fluid in cylinder 40 and holding the propeller blades in whatever position of adjustment they occupy at that time.

A speed respective mechanism such as the flyball governor 84 adjusts valve member 78 in accordance with the speed of the drive engine thereby tending to maintain a constant engine speed by adjustment of the propeller pitch.

For effecting the instantaneous feathering of the propeller there is provided cam 86 which may be manually operated from the pilot's cabin by a lever 88 and which is effective when operated to force valve member 78 to its Figure 6 position. With the valve member so shifted, the inside of cylinder 40 is connected directly with reservoir 82 and spring 36 is effective for moving the propeller to full feathered position as rapidly as the oil can be expelled through tube 32 and valve 70 back to reservoir 82. Normally this will take only about three seconds as contrasted to conventional feathering arrangements which normally require eight to ten seconds.

It will be appreciated that the act of feathering the propeller in the manner described is done while the craft is in flight and the propeller is rotating and that for this reason the stop plungers 56 will be in their outer positions and thus will not engage the stop plates 54 and accordingly will not interfere with the feathering operation. From the foregoing it will be seen that this invention provides for an adjustable pitch propeller having a normal maximum pitch stopped position of the propeller blades which is entirely automatic in operation with manual means being provided whereby there can be a substantially instantaneous full feathering of the propeller so long as the propeller is rotating above a predetermined speed.

It will be understood that while the drawings illustrate the counter weights 52 so located that they lie in a plane extending at right angles to the axis of rotation of the propeller when the blades are full feathered, these weights could occupy a somewhat different position and could even be positioned rearwardly of the Figure 4 position when the propeller blades were full feathered. This might come about because of a somewhat different location of the counter weights 52 on the propeller blade to obtain the desired action for urging the blades toward increased pitch position during rotation, or on account of the propeller blade being skewed from end to end whereby the full feathered position thereof would be such that the counter weight 52 was moved beyond center.

It will also be understood that the specific governor control mechanism illustrated in the drawings and described in the specification is merely exemplary and that the specific form which this governor might take would be subject to wide variation with the essential thing being for the governor to release fluid under pressure to the servo mechanism for the propeller blades when it was desired to decrease the pitch thereof, and to release pressure fluid therefrom for increasing the said pitch.

In order to unfeather a propeller once it has been full feathered and it is desired to bring the propeller back into service, the governor control is restored to its normal operating position which closes the governor by-pass valve. Thereafter, oil pressure is again established against the piston which moves the propeller blades and this re-establishing of oil pressure can be accomplished in any of several different manners. For example, merely starting the engine will develop pressure on the pump supplying fluid to the governor and this will deliver pressure fluid to the piston thus unfeathering the blades of the pertaining propeller.

Still another manner of supplying fluid pressure to the piston for unfeathering the propeller would be to utilize oil from an auxiliary tank filled with oil and air with the air under pressure. Such a tank could be maintained under pressure by fluid from the governor pump when the said pump was operating by way of a manually controlled valve.

It is also possible to employ pressure fluid from one governor pump for supplying the piston of the propeller pertaining to another governor pump and this last arrangement would merely involve a connection of a pipe between the governors with a simple control valve located therein.

*It will be apparent from the foregoing that the basic*

*control of the blade angle is the result of a novel combination of a hydraulic actuator, a spring, and speed responsive counter weight means. These elements are combined in a particularly advantageous manner to provide for a simple and effective control.*

It will be understood that this invention is susceptible to modification in order to adapt it to different usages and conditions, and, accordingly, it is desired to comprehend such modifications within this invention as may fall within the scope of the appended claims.

I claim:

1. In combination in a variable pitch propeller with a drive engine therefor; a hub, at least one blade extending radially from said hub and rotatable thereon about its axis, spring means urging said blade toward maximum pitch position, a fluid motor associated with the hub and blade responsive to fluid pressure for urging the blade toward decreased pitch position, a source of fluid pressure connected with said motor variable directly as the speed of the propeller, stop means between the hub and blade for stopping the propeller at a predetermined pitch when the propeller is moving toward increased pitch position, said stop means becoming ineffective upon the propeller attaining a predetermined speed of rotation whereby exhausting of said fluid motor during rotation of the propeller above said predetermined speed will permit full feathering of the said blade by said spring means whereas upon reduction of fluid pressure to said motor by gradually slowing the propeller down by de-energizing the drive engine for the propeller in a normal manner said stop will become effective to halt said blade at said predetermined pitch position.

2. In combination in a variable pitch propeller; a hub, at least one blade extending radially from said hub, and supported for rotation on the hub about the axis of the blade, a spring acting on the blade urging it toward full feathered position, an abutment means for stopping the blade in its said full feathered position, a fluid motor connected between the hub and the blade responsive to fluid pressure for moving the blade toward decreased pitch position against the thrust of said spring, a governor controlled fluid circuit for supplying pressure fluid to said motor under normal conditions, manual means selectively operable for exhausting said motor to permit said spring to feather said blade, and stop means between the blade and the hub for stopping the blade in a predetermined maximum pitch position less than full feathered position, said stop means including an element responsive to centrifugal force as the propeller rotates for making the said stop means ineffective when the propeller is rotating above a predetermined speed.

3. In combination in a variable pitch propeller having a hub and a radial blade rotatable thereon about the axis of the blade, a spring on the blade operable to move the blade from zero pitch position to full feathered position, a fluid motor between the blade and the hub responsive to fluid pressure to move the blade toward decreased pitch position against the thrust of said spring, a plunger carried by said hub and spring urged radially inwardly so that at a predetermined rotational speed of said propeller the said plunger will move outwardly, and a stop element on said blade adapted for abutting the plunger only in its inward position whereby when the propeller is rotating and said fluid motor is exhausted the spring will move the blade to full feathered position whereas, when the propeller is brought gradually to a halt in the normal manner the said plunger and stop element will engage and halt the blade in a predetermined maximum pitch position.

4. In combination; a variable pitch propeller comprising a hub and blade extending radially therefrom, said blade being rotatably supported on said hub for rotation about the axis of the blade, a piston element mounted on said hub coaxially with the axis of rotation thereof, a cylinder element movable on said piston element and connected with said blade so that movement of the cylinder element by a supply of fluid thereto will decrease the pitch of said blade, a tube connected with said cylinder element and extending through said piston element coaxially therewith, a collar on the inner end of said tube, a spring bearing between said collar and said piston element for urging the tube and cylinder element in a direction to increase the pitch of said blade, abutment means for stopping the propeller blade in a full feathered position, a stop element carried by said blade and extending radially therefrom, and a plunger carried by said hub and spring urged radially inwardly so as to engage said stop element in its innermost position only, whereby said plunger will throw outwardly when the propeller is rotating above a predetermined speed and said stop element being so located on said blade that when it engages said plunger, said blade will be stopped in an intermediate pitch position.

5. In a variable pitch propeller having a hub and a blade extending radially therefrom, said blade being rotatable on its axis on said hub, spring means acting on the blade urging it toward full feathered position, fluid operable means connected between said blade and hub responsive to fluid pressure for moving the blade toward decreased pitch position, a stop element carried by the blade extending radially therefrom at the hub end thereof, a radially extending plunger carried by the hub and having an innermost position where it will be engaged by said stop element, a spring urging said plunger inwardly so that at a predetermined speed of rotation of said propeller the plunger will move outwardly and out of the path of said stop element, and said stop element and plunger being so located that they will engage with the blade in an intermediate pitch position.

6. In a variable pitch propeller having a hub and a blade extending radially therefrom, said blade being rotatable on its axis on said hub, spring means acting on the blade urging it toward full feathered position, fluid operable means connected between said blade and hub responsive to fluid pressure for moving the blade toward decreased pitch position, a stop element carried by the blade extending radially therefrom at the hub end thereof, a radially extending plunger carried by the hub and having an innermost position where it will be engaged by said stop element, a spring urging said plunger inwardly so that at a predetermined speed of rotation of said propeller the plunger will move outwardly and out of the path of said stop element, said stop element and plunger being so located that they will engage with the blade in an intermediate pitch position, and said blade also being provided with a counterweight extending outwardly from one side in a direction substantially normal to the plane of said blade.

*7. In a variable pitch propeller blade and counterweight combination as set forth in claim 6, wherein said counterweight extends from the camber side of said blade and is arranged to increase the pitch of the blade when the same is in the region of the take-off pitch and to urge the blade toward decreased pitch position when the counterweight occupies a center of gravity position rearwardly of the plane of rotation of said blade.*

*8. A full feathering variable pitch propeller blade structure comprising a hub and blade extending radially therefrom, said blade being rotatably supported on said hub for rotation about the axis of the blade, a fluid motor comprising a piston element mounted on said hub coaxially with the axis of rotation thereof, and a cylinder element movable on said piston element and connected with said blade so that movement of the cylinder element by a supply of fluid thereto will decrease the pitch of said blade, a tube connected with said cylinder element and extending through said piston element coaxially therewith, a collar on the inner end of said tube, a spring bearing between said collar and said piston element for urging the tube and cylinder element in a direction to*

*increase the pitch of said blade to full feathering position, and said blade also being provided with a counterweight rigidly fixed thereon and extending outwardly from one side in a direction substantially normal to the plane of said blade whereby the pitch of the blade is increased when the same is in the region of the take-off pitch and coacts with said spring to increase the pitch of the blade to full feathered position upon failure of said fluid supply.*

*9. A full feathering variable pitch propeller blade structure comprising a hub and blade extending radially therefrom, said blade being rotatably supported on said hub for rotation about the axis of the blade, a fluid motor element connected to said blade and movable by a supply of fluid thereto for decreasing the pitch of said blade, a spring means acting on said blade to move the same to full feathered position, counterweight means extending*

*from the side of said blade and coacting with said spring means to move the blade to full feathered position instantly upon failure of the supply of fluid to said fluid motor.*

References Cited in the file of this patent or the original patent

UNITED STATES PATENTS

| | | |
|---|---|---|
| Re. 20,283 | Caldwell | Mar. 9, 1937 |
| 2,105,843 | Preston et al. | Jan. 18, 1938 |
| 2,145,859 | Caldwell | Feb. 7, 1939 |
| 2,146,334 | De Caria | Feb. 7, 1939 |
| 2,163,663 | Caldwell | June 27, 1939 |
| 2,304,153 | Di Cesari | Dec. 8, 1942 |
| 2,427,586 | Biermann | Sept. 16, 1947 |
| 2,513,660 | Martin et al. | July 4, 1950 |